United States Patent [19]

Dmitriev et al.

[11] 4,033,116
[45] July 5, 1977

[54] FUEL DISTRIBUTION ARRANGEMENT

[76] Inventors: Vasily Petrovich Dmitriev, ulitsa Kalinina 10, kv. 20; Anatoly Mikhailovich Polyakov, ulitsa Gorkogo, 35, kv. 6; Alexandr Grigorievich Tomilin, ulitsa Kalinina 28, kv. 22; Stanislav Mikhailovich Shushpan, ulitsa Pushkina 27/28, kv. 8, all of Stupino Moskovskoi oblasti, U.S.S.R.

[22] Filed: Sept. 23, 1975

[21] Appl. No.: 616,067

[52] U.S. Cl. .................... 60/39.28 R; 60/39.28 T
[51] Int. Cl.² .................................. F02C 9/08
[58] Field of Search ............... 60/39.28 R, 39.28 T

[56] References Cited
UNITED STATES PATENTS

| | | | |
|---|---|---|---|
| 3,197,958 | 8/1965 | Davies | 60/39.28 R |
| 3,367,107 | 2/1968 | Richardson | 60/39.28 R |
| 3,411,291 | 11/1968 | Tyler | 60/39.28 R |
| 3,630,029 | 12/1971 | Smith | 60/39.28 R |
| 3,713,290 | 1/1973 | Gold | 60/39.28 R |

*Primary Examiner*—Clarence R. Gordon

[57] ABSTRACT

Fuel distribution apparatus comprising a jet and two valves arranged in parallel in a passage connecting the fuel delivery line to the main manifold. The first valve maintains a predetermined pilot manifold pressure required for steady combustion of the fuel delivered through the pilot manifold. The second valve has a flow area greater than that of the jet and the first valve. When engine speed is reached at which the combustion of the fuel delivered through the main manifold becomes steady, the second valve opens and allows fuel to flow therethrough, effectively bypassing the jet and the first valve.

5 Claims, 2 Drawing Figures

FUEL DISTRIBUTION ARRANGEMENT

FIELD OF THE INVENTION

The present invention relates to apparatus for regulating fuel delivery in a gas-turbine engine and has particular reference to apparatus for distributing fuel between the manifolds of a gas-turbine engine with a vaporizing combustion chamber.

BACKGROUND

Known in the art is an arrangement which distributes fuel between the main and the pilot manifolds of a gasturbine engine and is controlled, for example, by compressor output air pressure. Such arrangement comprises a needle valve incorporated in a passage connecting the metering element delivery line to the main fuel manifold.

The main and pilot manifolds are connected respectively with vaporizing-type main burners and swirl-type pilot burners in the engine combustion chamber. The needle valve is connected through a mechanical linkage to a bellows arranged to receive air from the engine compressor.

During the initial period of starting the gas-turbine engine the passage conveying fuel from the metering element to the main manifold is shut off by the needle valve and the entire fuel supply from the metering element is delivered into the pilot manifold from where it is injected through the swirl-type pilot burners into the combustion chamber. Fuel combustion raises gas temperature at the entry to the turbine, which causes an increase in engine speed during the initial starting period. Under these conditions the compressor output pressure and, consequently, the pressure inside the bellows increases. The bellows extends and partially opens the needle valve, whereby the fuel supply from the metering valve is allowed to pass into the main manifold and the vaporizing-type burners of the main manifold discharge the fuel into the combustion chamber. As the compressor output pressure increases, the needle valve opens further and the supply of fuel from the metering element to the main manifold increases.

The arrangement described above suffers from the disadvantage that it has no provision for regulating the fuel pressure in the pilot manifold and the minimum rate of fuel flow in the main manifold is difficult to control. This causes high pressure build-up in the pilot manifold, which results in local overheating of the combustion chamber flame tube and non-uniformity of the combustion chamber temperature field whereby, the engine fails to start surely.

An arrangement is known in the art which partially eliminates these disadvantages. In this arrangement a valve is provided in the passage connecting the metering element delivery line to the main manifold, and a fuel jet is provided in the passage connecting the metering element delivery line to the pilot manifold. Said valve maintains the fuel pressure in the metering element delivery line depending on the fuel pressure differential across the jet. However, the fuel pressure in the metering element delivery line varies with alteration of the rate of fuel flow resulting, for example, from changes in the engine operating conditions (such as speed and altitude of flight). Furthermore, there is no provision for fuel to go past said jet and valve incorporated in the passages connecting the metering element delivery line to the main and pilot manifolds, which condition results in pressure build-up in the fuel pump and consequent shortening of the pump life.

It is known that variation in ambient air temperature affects the fuel atomizing performance of swirl-type burners. The fuel distributing arrangements known in the prior art do not cater to this condition and therefore they adversely affect fuel atomization at low ambient temperatures or cause gas overheating at the entry to the turbine at high ambient temperatures.

SUMMARY OF THE INVENTION

It is an object of the present invention to provide an arrangement for distributing fuel between the manifolds of a gas-turbine engine, said arrangement providing for sure engine starting.

It is a further object of the present invention to provide for decrease of fuel pressure in gas-turbine engine fuel lines.

It is still a further object of the present invention to provide for sure atomizing action of the pilot burners at various ambient air temperatures by maintaining the required fuel pressure in the pilot manifold of a gas-turbine engine.

These and other objects are achieved by providing an arrangement for distributing fuel between the main and pilot manifolds of a gas-turbine engine through passages connecting said manifolds to the metering element delivery line, which arrangement comprises a fuel jet and two valves adapted to distribute fuel between said manifolds by maintaining the predetermined fuel pressure in the metering element delivery line.

According to the invention, said jet and valves are incorporated in the passage connecting the fuel delivery line to the main manifold, being arranged to operate in parallel. When the fuel pressure in the delivery line reaches the predetermined value, the first valve opens and permits fuel to flow therethrough, bypassing the jet. The second valve is arranged to open at the engine speed corresponding to steady combustion of the fuel delivered from the main manifold. When said second valve opens, it allows fuel to flow therethrough, bypassing the jet and the first valve.

The arrangement which constitutes the present invention maintains the required constant fuel pressure in the pilot manifold during the initial period of engine acceleration and provides for sure changeover to engine operation on the fuel injected through the vaporizing-type burners of the main manifold.

Furthermore, this arrangement provides for decrease of pressure in the fuel lines of a gas-turbine engine, which lengthens the life of the fuel pump involved.

The first valve has provision for adjusting the pilot manifold fuel pressure independently of the engine operating conditions, which ensures steady atomizing performance of the pilot burners.

According to one of the embodiments of the invention, the first valve is constructed in the form of a plunger fitted in a stationary sleeve. The plunger end facing toward the metering element delivery line is loaded by a spring seated on a movable rod provided in an ambient air temperature sensor. The other end of the plunger is loaded by a spring seated on a valve adjusting screw.

This construction of the valve provides for maintaining the required constant fuel pressure in the pilot manifold when the engine accelerates on the fuel delivery from the pilot burners and also provides for sure changeover from this mode of operation to engine running on the fuel delivery from the vaporizing-type burners of the main manifold.

Furthermore, this construction of the valve provides for proper atomizing action of the pilot burners required for steady fuel combustion at various ambient air temperatures.

BRIEF DESCRIPTION OF THE DRAWING

The invention will be described in detail with reference to the accompanying drawings in which.

DETAILED DESCRIPTION

Figure 1:
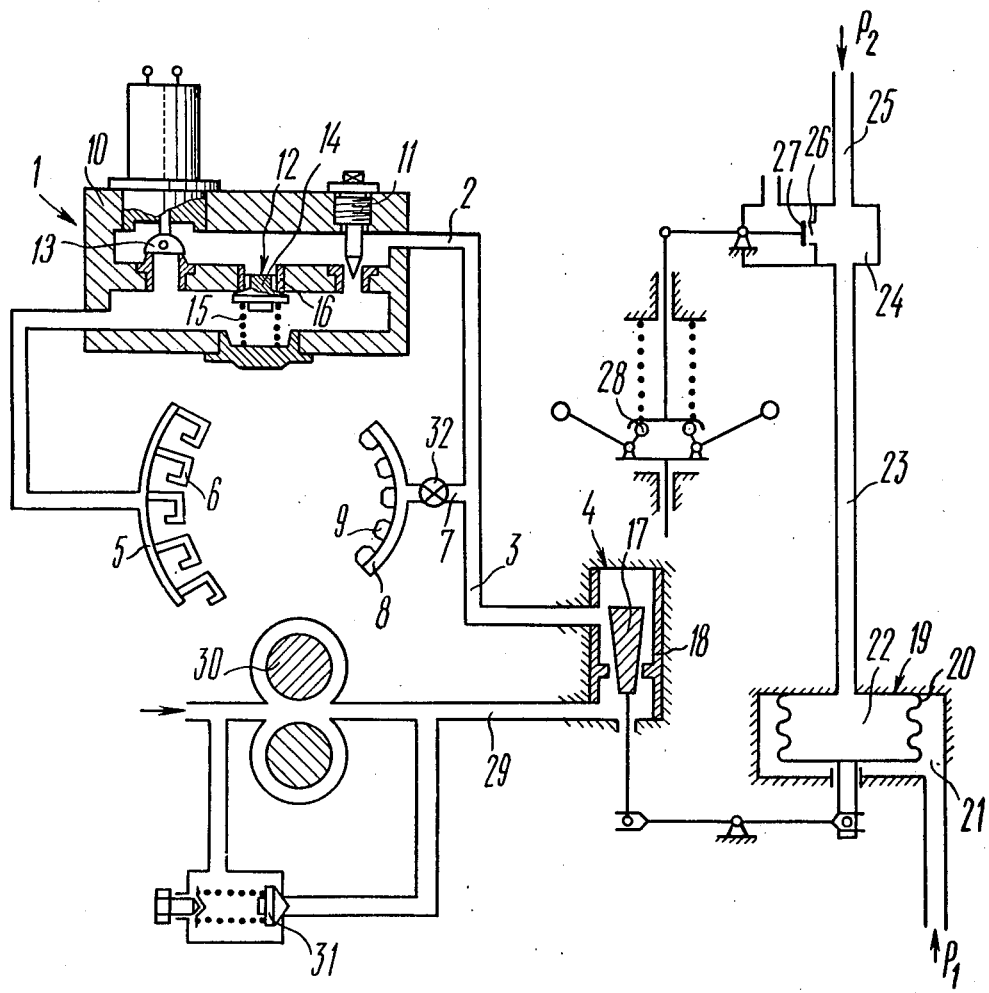
FIG. 1 diagrammatically shows a gas-turbine fuel supply regulating system with a fuel distributing arrangement according to the present invention.

The arrangement 1 (FIG. 1) for distributing fuel between the manifolds of a gas-turbine engine communicates with a passage 2 which connects the fuel delivery line 3 of a fuel metering element 4 to a main manifold 5 with vaporizing-type burners 6. A passage 7 connects the fuel delivery line 3 to a pilot manifold 8 with swirl-type pilot burners 9.

The arrangement 1 comprises a body 10 which incorporates a jet 11, a valve 12 and a valve 13, said three elements being arranged for work in parallel. The valve 12 comprises a movable member 14 held by a spring 15 against a seat 16. The tension of the spring 15 is chosen so as to maintain the fuel pressure in the pilot manifold 8 at the value required for steady combustion of the fuel delivered through the pilot burners 9. The flow area of the jet 11 is chosen so as to enable fuel to prime the main manifold 5, before the valve 12 opens. The flow area of the valve 13 is much greater than the flow area of both the jet 11 and a valve 12.

The metering element 4 has a needle 17 and a body 18. The needle 17 is connected through a mechanical linkage to a control unit 19 which comprises a bellows 20, a chamber 21 and a chamber 22. The chamber 21 connects with the inlet to the engine compressor (not shown). The chamber 22 communicates via a pipeline 23 with a chamber 24 arranged to receive air from the engine compressor through a pipeline 25. Provided in one of the walls of the chamber 24 is a hole 26 adapted to open said chamber 24 to the atmosphere. The flow area of the hole 26 is regulated by a valve 27 which is controlled by a centrifugal speed sensor 28 of an engine speed governor (the latter is not shown). The metering element 4 is connected to a fuel pump 30 by a fuel line 29. The maximum pressure developed by the pump 30 is limited by a bypass valve 31. Incorporated in the passage 7 is a valve 32 adapted for shutting off the fuel delivery to the pilot manifold 8.

The arrangement 1 operates as follows:

During the initial starting period the fuel delivered by the pump 30 passes through the metering element 4 into the delivery line 3 from where part of the fuel flows through the passage 7 into the pilot manifold 8 and is injected through the swirl-type burners 9 into the engine combustion chamber (not shown). The combustion of the fuel delivered through the pilot burners 9 causes an increase in the turbine inlet temperature and a consequent increase in engine speed.

The other part of the fuel passes from the delivery line 3 via the passage 2 and the jet 11 into the main manifold 5 and the vaporizing-type main burners 6 whereby said manifold and burners are primed and made ready for operation.

As the engine speed increases, the compressor output pressure rises. In consequence, the pressure in the chamber 24 builds up, the bellows 20 extends and moves the needle 17, thereby increasing the open flow area of the metering element 4. The rate of fuel flow through the metering element 4 increases and therefore the pessure in the delivery line 3 increases. When the fuel pressure in the delivery line 3 reaches the value determined by the tension of the spring 15 which loads the valve 12, more fuel passes through the valve 12 into the main manifold 5 and is then discharged through main burners 6 into the combustion chamber where it vaporizes and mixes with air.

When the proper fuel/air ratio is reached, the mixture is ignited.

During the further acceleration of the engine the valve 12 maintains constant fuel pressure in the delivery line 3 and increase of fuel flow through the metering element 4 is accompanied by a smooth increase of fuel flow through the valve 12, the main manifold 5 and the main burners 6.

The increase of fuel through the main manifold 5 results in steady combustion of the fuel discharged through the main burners 6.

Figure 2:
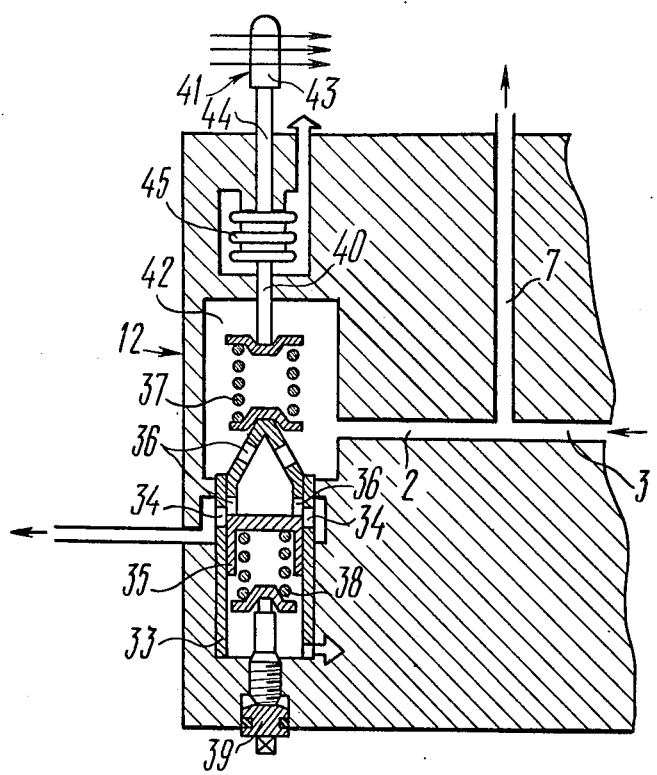
FIG. 2 is a sectional view showing the construction of the first valve according to one of the embodiments of the invention.

When engine speed is reached at which the combustion of the fuel discharged through the main burners 6 becomes steady, the engine speed sensor (not shown) sends a signal to open the valve 13. After the valve 13 opens, the fuel flows through it, bypassing the jet 11 and the valve 12 inasmuch as their flow areas are far smaller that that of the valve 13. Thus the process of distributing the fuel between the manifolds 5 and 8 is completed and the fuel pressure in the engine fuel lines is reduced. FIG. 2 diagrammatically shows the construction of the valve 12 according to one of the embodiments of the invention. The valve 12 comprises a stationary sleeve 33 with ports 34. Inside the sleeve 33 is movably mounted a hollow plunger 35 having ports 36 in the side and end walls. The plunger 35 is loaded by springs 37 and 38. The spring 38 is seated on a screw 39 adapted to adjust the valve 12 to the required fuel pressure in the pilot manifold 8. The spring 37 is seated on a movable rod 40 provided on a temperature sensor 41, said spring 37 being located in a chamber 42 which communicates through the passage 2 with the fuel delivery line 3 of the metering element 4. The temperature sensor 41 comprises a capsule 43 filled with liquid having a high thermal expansion coefficient. The capsule 43 is connected by a pipeline 44 to a bellows 45 which is rigidly connected to the rod 40.

The valve 12 operates as follows:

When the ambient air temperature lowers, the liquid in the capsule 43 contracts and the bellows 45 retracts accordingly. The resultant movement of the rod 40 decreases the tension of the spring 37 which causes the valve 12 to open at a high fuel pressure in the chamber 42. Accordingly, the fuel pressure increases in the delivery line 3 of the metering element 4 and in the pilot manifold 8. The increase of fuel pressure in the pilot manifold 8 assists the swirl-type pilot burners 9 to properly atomize the fuel whose viscosity increases with lowering ambient temperature. Thereby the burning of the fuel in the engine combustion chamber is improved and sure engine starting is obtained.

When the ambient air temperature increases, the liquid in the capsule 43 expands, the bellows 45 extends and moves the rod 40 in the opposite direction. Now the reverse takes place, viz.: the tension of the spring 37 increases and this causes the valve 12 to open at a lower fuel pressure in the chamber 42. Accordingly, the fuel pressure in the pilot manifold 8 lowers to the value required for steady combustion and sure engine starting at the given ambient air temperature.

What is claimed is:

1. Apparatus for distributing fuel between a main manifold and a pilot manifold of a gas-turbine engine via passages connecting said manifolds and a fuel delivery line with a metering element, said apparatus comprising: a jet and two valves installed in parallel in the passage connecting the fuel delivery line and the main manifold, the first of said two valves comprising a stationary sleeve, a plunger in said stationary sleeve for controlling flow of fuel to said main manifold and means applying spring-bias to said plunger at the fuel delivery side to said main manifold, and means coupled to the second of said two valves for operating the same in response to engine speed.

2. Apparatus as claimed in claim 1 wherein said first valve comprises an ambient air temperature sensor and a servo element, said plunger having an end facing the fuel delivery line for controlling fuel delivery therethrough, a spring seated on said servo element and on said end of the plunger for applying a spring bias thereto, said servo element varying the tension of said spring with variation in the temperature of the ambient air, said plunger having an opposite end, said means for applying spring bias to the plunger comprising a further spring bearing against said opposite end and means for adjusting the tension of said further spring to adjust said first valve to a predetermined fuel pressure in said fuel delivery line.

3. Apparatus as claimed in claim 2 wherein said means for adjusting the tension of said further spring comprises an adjustment screw adjustably supporting said further spring.

4. Apparatus as claimed in claim 1 wherein said second valve has a flow area which is substantially greater than the combined flow area of said jet and said first valve.

5. Apparatus as claimed in claim 1 comprising differential pressure sensing means coupled to the metering element for controlling the supply of fuel to said fuel delivering line according to the difference between the inlet and outlet pressures of an air compressor coupled to the engine.

* * * * *